US006296763B1

(12) United States Patent
Hicks

(10) Patent No.: US 6,296,763 B1
(45) Date of Patent: Oct. 2, 2001

(54) DOUBLE RECEPTACLE FILTRATION SYSTEM

(75) Inventor: Richard Banfield Hicks, Surrey (GB)

(73) Assignee: DiaSys Europe Limited (GB)

( * ) Notice: Subject to any disclaimer, the term of this patent is extended or adjusted under 35 U.S.C. 154(b) by 0 days.

(21) Appl. No.: 09/355,820

(22) PCT Filed: Feb. 5, 1998

(86) PCT No.: PCT/GB98/00364

§ 371 Date: Oct. 22, 1999

§ 102(e) Date: Oct. 22, 1999

(87) PCT Pub. No.: WO98/34710

PCT Pub. Date: Aug. 13, 1998

(30) Foreign Application Priority Data

Feb. 5, 1997 (GB) .................................................. 9702327

(51) Int. Cl.$^7$ ............................ B01D 29/11; B01D 35/00

(52) U.S. Cl. ................. 210/244; 210/380.1; 210/497.01; 210/498; 422/101

(58) Field of Search .................................... 210/244, 295, 210/310, 380.1, 448, 463, 498, 497.01; 422/72, 101

(56) References Cited

U.S. PATENT DOCUMENTS

| | | | | |
|---|---|---|---|---|
| 751,918 | * | 2/1904 | Jagger | 210/448 |
| 916,340 | * | 3/1909 | Lewis | 210/448 |
| 2,579,863 | * | 12/1951 | Robinson | 210/448 |
| 5,545,318 | * | 8/1996 | Richmond | 210/232 |

FOREIGN PATENT DOCUMENTS

| | | | |
|---|---|---|---|
| 298513 | * | 5/1993 | (EP) . |
| WO 93/10433 | * | 5/1993 | (WO) . |

* cited by examiner

*Primary Examiner*—Matthew O. Savage
(74) *Attorney, Agent, or Firm*—Nixon Peabody LLP

(57) ABSTRACT

A faecal filter assembly comprises two open-mouthed receptacles adapted to be joined by a hollow stopper. A tubular filter extends centrally from the stopper so that the latter provides a shoulder at the open end of the receptacle where debris and the like will collect. The arrangement is such that when the assembly is placed in a centrifuge, centrifugal forces will not force debris through the filter but instead will collect it on the shoulder. Preferably the filter is a lattice of oppositely-extending ribs defining between them pores.

8 Claims, 1 Drawing Sheet

DOUBLE RECEPTACLE FILTRATION SYSTEM

FIELD OF THE INVENTION

This invention relates to improvements in filters.

BACKGROUND OF THE INVENTION

It is conventional to examine a biological sample, for example a faecal sample, by placing it in a first tubular receptacle which is then closed by a filter medium. The first tubular receptacle may be attached to a second one in axial alignment such that the sample will pass into the second receptacle from the first through the filter. Filtration can be achieved simply by standing the assembly with the first receptacle uppermost or it may be encouraged by shaking the joined receptacles and/or placing them in a centrifuge. Following the completion of filtration, particles trapped by the filter and/or precipitated to the closed end of the second receptacle can be removed for analysis.

A double-receptacle filtration system of this kind is particularly, although not exclusively, suitable for the treatment of faecal samples where it is desired to isolate and remove for analysis of parasites, their eggs and larvae which may be present in the sample. The handling of such samples is unpleasant and presents biological hazards so that the "closed" double-receptacle filtration system is particularly attractive. Hitherto, however, the filter medium used has most commonly been a disc of woven material or a molded lattice which can be fitted across the open mouth of the first receptacle. This is liable to become clogged and occluded by larger particles suspended in the sample, such as pieces of undigested food Moreover if the double-receptacle is placed in a centrifuge this will tend to drive particles through the filter into the second receptacle. For this reason filtering and centrifuging are normally done separately and this two-stage operation is time consuming and labor intensive, as well as representing a hazzard to the operator when the two receptacles are disconnected.

SUMMARY OF THE INVENTION

In accordance with the present invention there is provided a filtration assembly comprising a sample mixing receptacle closed at one end and open at its other end, a second receptacle having a closed end and an open end and adapted to be fixed in coaxial alignment with the mixing receptacle to receive filtrate from the latter when the two, joined receptacles are placed in a centrifuge and a stopper for the open end of the mixing receptacle, the whole assembly being adapted to be placed in a centrifuge, wherein a tubular filter extends from the center of the stopper such that when the mixing receptacle is stoppered a closed end of the filter confronts the closed end of the receptacle and an open end of the filter opens through the stopper, the stopper providing a shoulder around the filter at the open end of the mixing receptacle.

The tubular filter provides an enlarged filter area by comparison with a disc filter, but a more important advantage is that centrifugal forces, instead of driving particles through the filter will instead drive them off the filter and toward the shoulder, where they will be retained when the two receptacles are subsequently disconnected. This means that filtration and centrifugeing can be carried out as a single operation. There is less danger of contamination of the sample in the second receptacle and the two receptacles can be disconnected without exposing the operator to the residue in the first receptacle.

Preferably the stopper is adapted to make screw-threaded connections to both of the receptacles and means is provided whereby the second receptacle is preferentially unscrewed from the stopper when the two receptacles are oppositely twisted.

The filter preferably comprises a lattice structure of crossing, elongated elements of which at least those presented outwardly of the filter tube extend outwardly of the filter with respect to the plane of the pores formed by the crossing elements, thereby to provide ribs on the exterior of the lattice which will act as a pre-filter for larger particles in advance of said pores. The interior of the filter tube is preferably additionally ribbed, the internal ribs extending longitudinally of the filter tube and the external ribs extending transversely thereof.

It is known that tubular filters can be made by molding a plastics material into a lattice formation. However the porosity of such a "lattice" is considerably inferior to that of a woven filter, i.e. the pores of a molded filter are relatively few in relation to the total filtration area, so that it is not apparent that this alternative would be an improvement.

In accordance with a preferred embodiment of the present invention the filter comprises a lattice structure of crossing, elongated elements of which at least those presented outwardly of the filter tube extend outwardly of the filter with respect to the plane of the pores formed by the crossing elements, thereby to provide ribs on the exterior of the lattice which will act as a pre-filter for larger particles in advance of said pores.

Preferably the interior of the filter tube is additionally ribbed, the internal ribs extending longitudinally of the filter tube and the external ribs extending transversely thereof.

An advantage of this arrangment is that occlusion of part of the length of a channel defined by two adjacent ribs by a large particle will not occlude the pore or pores confronted by the trapped particle, because liquid will still reach said pore or pores along the channel beneath the particle. It has been calculated that particles just large enough to be trapped by the ribs can confront each pore within the lattice without any observable restriction of the flow of liquid through the filter. If the depth of the ribs is increased then larger particles can confront several pores within the lattice without any observable restriction in the flow through the filter.

In a molded, tubular construction any internal ribs must be longitudinal as otherwise it would be impossible to remove the mould core. Effectively this means that any external ribs must be transverse (the outer mould part being separated into two halves to remove it from the molded filter). Transverse external ribs on a tubular filter formation have a dual advantage. During manufacture and while the filter is still contained in the external mould part they serve to anchor it while the mould core is withdrawn from the interior of the filter. When the filter is in use the fact that the external ribs are transverse means that the channels formed between them are at right angles to the "natural flow" of the liquid sample out of the first receptacle. Causing the liquid to change direction to enter the channels enhances filtration by creating a greater tendency for larger particles to be trapped by the "pre-filter".

BRIEF DESCRIPTION OF THE DRAWINGS

A preferred embodiment of the invention will now be described with reference to the accompanying drawings, in which.

DETAILED DESCRIPTION OF THE INVENTION

Figure 1:
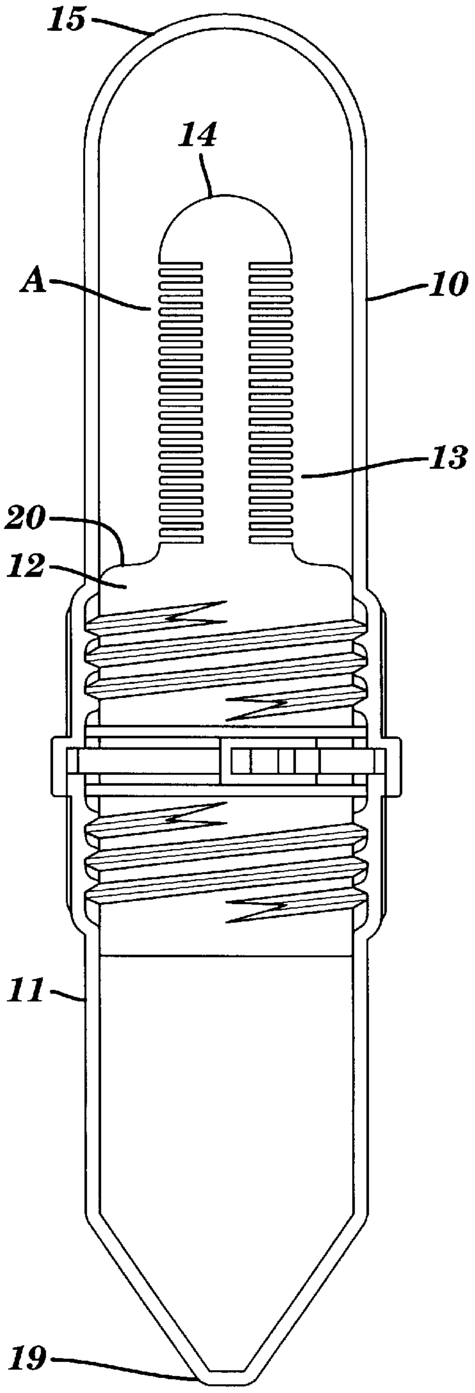
FIG. 1 is a sectional elevation of a faecal filter centrifuge tube assembly in accordance with the invention.
Figure 2:
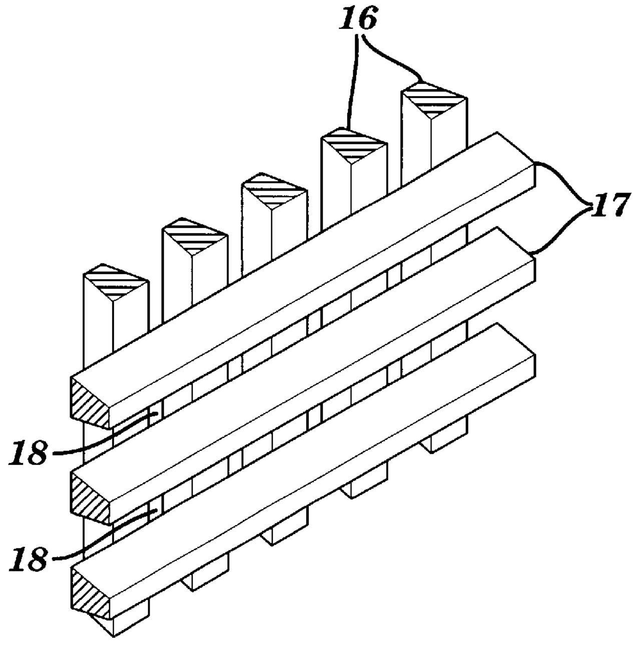
FIG. 2 is an enlargement of the area of the filter identified at "A" in FIG. 1.

The faecal filter illustrated comprises two similar, open-mouthed receptacles 10 and 11 adapted to be joined together mouth-to-mouth in axial alignment as illustrated. This assembly of the two receptacles 10 and 11 is adapted for placing in a centrifuge.

Prior to joining the two receptacles together a faecal sample is placed in the first receptacle 10, which is then stoppered by screwing into its mouth a hollow stopper assembly 12 from the center of which there then extends longitudinally within the receptacle 10 a tubular filter 13. This has a closed end 14 confronting the closed end 15 of receptacle 10. Its other end opens through stopper 12, which extends as an annular shoulder or flange 20 radially from the mouth of filter 13.

Tubular filter 13 is manufactured as a lattice of crossing, elongate members 16 and 17. The members 16, which are internal and extend longitudinally of the tubular filter 13, are offset from the members 17, which are external and extend transversely of the tubular filter 13, on opposite sides of the plane of the pores 18 which are bounded by the members. Thus the members 16 form longitudinal internal ribs of the filter while members 17 form transverse external ribs. Thus on both sides of the filter there are channels between parallel ribs 16 or 17 through which liquid will pass before passing through the pores 18.

The internal ribs 16 must be generally longitudinal of the filter 13 to enable it to be made in a moulding process from a plastics material, as otherwise the internal mould core (not shown) could not be withdrawn. The transverse arrangement of the external ribs 17, however, presents no such problem as two mould halves (not shown) of the external part of the mould can be separated to allow removal of the molded filter. Prior to such removal, however, the transverse ribs 17 allow the external mould part to grip the tube while the mould core is removed.

It will be seen that each rib 16 or 17 is of trapezium cross section and that its depth is greater than the width of each pore 18. The greater the depths of the channels, formed between parallel ribs 16 or 17, the less will be the tendency of any particle occluding a channel to occlude the pores in the bottom of the channel.

In use of the apparatus illustrated a faecal sample is placed in the receptacle 10, which is then stoppered with the filter assembly 12 and 13. When filtration is to be carried out the two receptacles 10 and 11 are joined mouth-to-mouth as shown and liquid is allowed to pass from receptacle 10 through the filter 13 into receptacle 11.

Particles too large to pass through the pores 18, for example pieces of undigested food, will tend to lodge across the ribs 17, thereby occluding part of the length of a channel between two adjacent ribs 17 but not occluding the pore or pores 18 immediately below the particle, because liquid can still reach such pore(s) along the length of the channel.

Filtration may be assisted by shaking the assembly of receptacles 10 and 11 and/or placing it in a centrifuge. Thereafter substantially all of the liquid formerly in receptacle 10 will have passed to receptacle 11 and any parasites, their eggs and/or larvae will collect at the closed end 19 of receptacle 11. As is known per se, after separating the two receptacles 10 and 11 the parasites may be removed from receptacle 11 by pipette for analysis. In this process the receptacle 10 is prevented from unscrewing from the hollow stopper 12 by a ratchet/friction mechanism such that the two parts are removed together. Meanwhile as soon as flow through the filter 13 has ceased particles trapped by the ribs 17 will fall to the shoulder 20 provided by the stopper element 12, or may be assisted to do so by tapping the receptacle 10.

What is claimed is:

1. A filtration assembly comprising:

a sample mixing receptacle closed at one end and open at its other end, the sample mixing receptacle provided with a stopper for the open end; and a second receptacle having a closed end and an open end, the second receptacle adapted to be fixed in coaxial alignment with the mixing receptacle to receive filtrate from the sample mixing receptacle, wherein a tubular filter extends centrally from the stopper such that when the sample mixing receptacle is stoppered a closed end of the tubular filter confronts the closed end of the sample mixing receptacle and an open end of the tubular filter opens through the stopper, the stopper providing a shoulder around the tubular filter at the open end of the sample mixing receptacle;

wherein the closed end of the mixing receptacle and the closed end of the second receptacle exclude any flow passages.

2. The assembly as claimed in claim 1, wherein the stopper is adapted to make screw-threaded connections to both of the receptacles.

3. The assembly as claimed in claim 1, wherein the tubular filter comprises a lattice structure of crossing, elongated elements of which at least those presented outwardly of the tubular filter extend outwardly of the filter with respect to a plane of pores formed by the crossing elongated elements, thereby providing ribs on the exterior of the lattice which will act as a pre-filter for larger particles in advance of the pores.

4. The assembly as claimed in claim 3, wherein the lattice structure of crossing, elongated elements comprises internal ribs extending longitudinally in a direction from the closed end of the tubular filter to the open end of the tubular filter and external ribs extending transversely to the internal ribs.

5. The filtration assembly according to claim 1, wherein the tubular filter comprises a lattice structure of crossing elongated elements, including (i) internal ribs extending longitudinally in a direction from the closed end of the tubular filter to the open end of the tubular filter and (ii) external ribs external ribs extending transversely to the internal ribs.

6. The filtration assembly according to claim 5, wherein the internal ribs and external ribs define a plurality of pores, whereby particles trapped by the external ribs can confront one or more pores without any observable restriction in the flow of liquid through the tubular filter.

7. A filtration assembly adapted for placing in a centrifuge, the assembly comprising:

a sample mixing receptacle closed at one end and open at its other end;

a stopper for the open end of the sample mixing receptacle; and a second receptacle having a closed end and an open end and adapted to be fixed in coaxial alignment with the mixing receptacle to receive filtrate from the latter, wherein a tubular filter extends centrally from the stopper such that when the sample mixing receptacle is stoppered a closed end of the tubular filter confronts the closed end of the sample mixing receptacle and an open end of the tubular filter opens through the stopper, the stopper providing a shoulder around the tubular filter at the open end of the sample mixing receptacle, and wherein the tubular filter comprises a lattice structure of crossing, elongated elements of which at least those presented outwardly of the tubular filter extend outwardly of the tubular filter with respect to pores formed by the crossing, elongated elements, thereby to provide external ribs on the exterior of the lattice structure which will act as a pre-filter for larger particles in advance of the pores.

8. The assembly as claimed in claim 7, wherein the lattice structure comprises internal ribs extending longitudinally of the tubular filter and the external ribs extend transversely to the internal ribs.

* * * * *